United States Patent
Dixon et al.

(10) Patent No.: US 10,360,473 B2
(45) Date of Patent: Jul. 23, 2019

(54) USER INTERFACE CREATION FROM SCREENSHOTS

(71) Applicant: Adobe Inc., San Jose, CA (US)

(72) Inventors: Morgan Emory Dixon, Seattle, WA (US); Lubomira Assenova Dontcheva, Seattle, WA (US); Joel Richard Brandt, San Francisco, CA (US); Amanda Marie Swearngin, Seattle, WA (US)

(73) Assignee: Adobe Inc., San Jose, CA (US)

( * ) Notice: Subject to any disclaimer, the term of this patent is extended or adjusted under 35 U.S.C. 154(b) by 75 days.

(21) Appl. No.: 15/608,641

(22) Filed: May 30, 2017

(65) Prior Publication Data
US 2018/0349730 A1 Dec. 6, 2018

(51) Int. Cl.
*G06K 9/62* (2006.01)
*G06F 3/0484* (2013.01)
*G06F 3/0486* (2013.01)

(52) U.S. Cl.
CPC ....... *G06K 9/6202* (2013.01); *G06F 3/04845* (2013.01); *G06F 3/0486* (2013.01)

(58) Field of Classification Search
CPC .................................................. G06F 3/0484
See application file for complete search history.

(56) References Cited

U.S. PATENT DOCUMENTS

| | | | |
|---|---|---|---|
| 2007/0079236 A1* | 4/2007 | Schrier | G06F 17/217 715/206 |
| 2008/0079727 A1* | 4/2008 | Goldman | G06T 11/60 345/441 |
| 2010/0198941 A1* | 8/2010 | Rhoads | G06K 9/00442 709/217 |
| 2011/0200120 A1* | 8/2011 | Lareau | H04N 5/2357 375/240.26 |
| 2017/0147996 A1* | 5/2017 | Kirley | G06Q 20/10 |
| 2017/0192797 A1* | 7/2017 | Snir | G06F 8/38 |
| 2018/0137219 A1* | 5/2018 | Goldfarb | G06F 17/5009 |

* cited by examiner

*Primary Examiner* — David E Choi
(74) *Attorney, Agent, or Firm* — SBMC

(57) ABSTRACT

User interface creation from screenshots is described. Initially, a user captures a screenshot of an existing graphical user interface (GUI). In one or more implementations, the screenshot is processed to generate different types of templates that are modifiable by users to create new GUIs. These different types of templates can include a snapping template, a wireframe template, and a stylized template. The described templates may aid GUI development in different ways depending on the type selected. To generate a template, the screenshot serving as the basis for the template is segmented into groups of pixels corresponding to components of the existing GUI. A type of component is identified for each group of pixels and locations in the screenshot are determined. Based on the identified types of GUI components and determined locations, the user-modifiable template for creating a new GUI is generated.

20 Claims, 9 Drawing Sheets

USER INTERFACE CREATION FROM SCREENSHOTS

BACKGROUND

For many years, users interacted with computing devices using just keyboards and displays—users input information, such as commands, to the devices via keyboards and the devices output information to users visually via the displays, largely in the form of text and limited graphics. The advent of the computing mouse enabled users to provide a different type of input to computers. Namely, the mouse allowed users to quickly and intuitively change a position of a pointer within a graphical user interface (GUI) and to 'click' buttons of the mouse once or in rapid succession to provide additional input relative to the pointer position. Many advances have been made in relation to providing input to computing devices. For instance, many computing devices are equipped to handle touch and stylus based input in addition to mouse inputs. Even with these advances, GUIs continue serve as one of the principle manners in which users interact with computing devices and applications, e.g., GUIs can be configured to support mouse input, touch input, stylus input, or some combination of these and other types of inputs.

Given this, graphical user interface development remains a significant part of producing computing applications, web pages, and so forth. To develop GUIs, many developers take inspiration from existing interfaces. In particular, many GUI developers take screenshots of existing interfaces (or at least portions), import the screenshots into GUI-development tools, and construct new user interfaces using the screenshots as templates. Conventional techniques for constructing new interfaces from screenshots can involve a GUI developer dragging a shape, such as rectangle, onto a screenshot and manually adjusting characteristics of the shape to match a corresponding shape of the screenshot. This manual shape choosing and adjusting can be tedious for developers, however. Consequently, conventional techniques can frustrate developers and consume their valuable time.

SUMMARY

To overcome these problems, user interfaces are created from screenshots in a digital medium environment. Initially, a user captures a screenshot of an existing graphical user interface (GUI), e.g., by drawing a capture-window around the existing GUI and selecting to capture the screenshot. In one or more implementations, the screenshot is processed to generate different types of templates that are modifiable by users to create new GUIs. These different types of templates can include a snapping template, a wireframe template, and a stylized template. The described templates may aid GUI development in different ways depending on the type selected. To generate a template, the screenshot serving as the basis is segmented into groups of pixels that correspond to components of the existing GUI. A type of component is identified for each group of pixels, where a type of component may correspond to different-shaped components (e.g., square, rectangle, circle, etc.), text components, and so forth. Locations in the screenshot are also determined for the components of the existing GUI. Based on the identified types of GUI components and determined locations, the user-modifiable template for creating a new GUI is generated. Some templates include styling of the existing GUI. In such implementations, the styling of the existing GUI's components is determined and applied to new GUI components of a stylized template.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
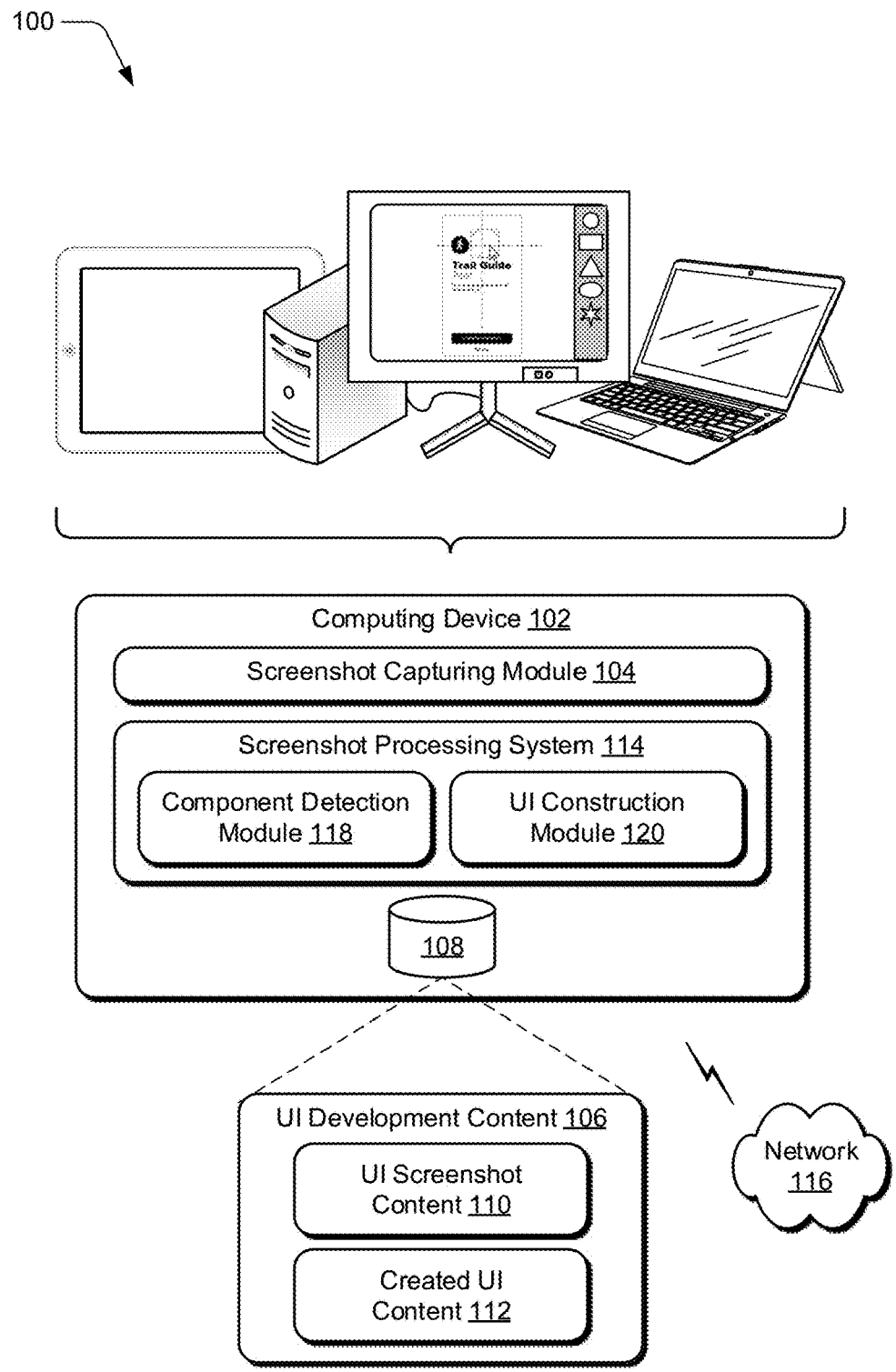
FIG. 1 is an illustration of an environment in an example implementation that is operable to employ techniques described herein.

To develop GUIs, many developers take inspiration from existing interfaces. In particular, many GUI developers take screenshots of existing interfaces (or at least portions), import the screenshots into GUI-development tools, and construct new user interfaces using the screenshots as templates. Conventional techniques for constructing new user interface designs from screenshots can involve a GUI developer dragging a shape, such as rectangle, onto a screenshot and manually adjusting characteristics of the shape to match a corresponding shape of the screenshot. This manual shape choosing and adjusting can be tedious for developers, however. Consequently, conventional techniques can frustrate developers and consume their valuable time.

To overcome these problems, user interfaces are created from screenshots in a digital medium environment. In one or more implementations, a screenshot of a GUI can be processed to generate different types of templates that are modifiable by users to create new GUIs. These different types of templates include at least a snapping template, a wireframe template, and a stylized template. The described templates may aid GUI development in different ways depending on the type selected. This can result in easier and more efficient development of GUIs, thereby lessening developer frustration and reducing an amount of time it takes developers to produce GUIs from screenshots.

The snapping template, for instance, may allow users to create new GUI components (e.g., different shapes, text boxes, lines, and so forth), move the new components around a workspace that includes the snapping template, and snap the new components to different alignment markers of the snapping template. Broadly speaking, the alignment markers correspond to geometric landmarks of the GUI captured in the screenshot. Consider an example in which the captured GUI has a square-shaped component. In this example, the snapping template may include alignment markers—that correspond to the corners of the square, a center of the square, and halfway points along the edges of the square—to which new GUI components created by the user can be snapped. The snapping template may also enable new components to be snapped to axes that extend along or through the alignment markers, such that a new GUI component can be aligned in one example with a vertical middle of one of the captured GUI's components.

In contrast to the snapping template, the wireframe and stylized templates include new GUI components that are automatically created and positioned in accordance with the described techniques. In wireframe templates, new GUI components are generated to generally approximate the components of a captured GUI. In particular, the new GUI components of wireframe templates may have a same size and shape as corresponding components of the captured GUI, but be unstylized. By way of example, an existing GUI captured in a screenshot may have a component (e.g., a button) that is a solid-filled blue rectangle with rounded corners. A wireframe template of this GUI can be generated to include a rectangle with rounded corners and having a same size as the blue-filled rectangle of the existing GUI. However, the wireframe template's rectangle may not be solid-filled blue. Instead, this rectangle may be filled with a default filling that is intended to be modified by the user as part of creating a new GUI.

In stylized templates though, the new GUI components may be stylized according to styles of the captured GUI. Consider again the example in which an existing GUI captured in the screenshot has a component that is a solid-filled blue rectangle with rounded corners. A stylized template of this GUI can be generated to include a rectangle that not only has rounded corners and a same size as the blue-filled rectangle of the existing GUI, but also has a solid blue filling. In stylized templates, a variety of styles determined from the captured GUI can be applied to the new GUI components, such as font type, font color, shape color, shadowing, fill type (e.g., solid, gradient, pattern, no fill), line attributes (e.g., weight, color, type), opacity, and so forth. A variety of other templates that assist developers with GUI development may also be generated from screenshots of existing GUIs without departing from the spirit or scope of the techniques described herein.

In order to generate such templates, a screenshot of an existing GUI may initially be segmented into groups of pixels that correspond to components of the existing GUI. A type of component can then be identified for each group of pixels, where a type of component may correspond to different-shaped components (e.g., square, rectangle, circle, etc.), text components, and so forth. In one or more implementations, the components are identified using a component recognition model. The component model may be trained on a set of images of user interface components and configured to indicate a component type for each group of pixels based on detection of characteristics associated with the indicated type. In addition to component type, locations in the screenshot are also determined for the components of the existing GUI. Based the identified types of GUI components and determined locations, one of the above-described types of templates may be generated. When a stylized template is generated, the described techniques also involve determining styling of the existing GUI's components and applying at least some of the determined styling to the new GUI components. These templates may enable easier and faster development of new GUIs from screenshots than conventional techniques.

Term Descriptions

As used herein, a "GUI component" refers to a region of a GUI that is different or otherwise separated from other regions of the GUI. By way of example, a region of a GUI that forms a GUI component may have at least one of a boundary or different characteristics that cause it to be different or separated from the other portions of the GUI. Examples of different types of GUI components include different-shaped components (e.g., square, rectangle, circle, ellipse, etc.), line components (e.g., horizontal lines separating portions of a GUI), text components (e.g. text boxes, headings, labels), and so forth. In some aspects, GUI components may overlap. By way of example, a GUI may comprise a background rectangle and a variety of other components overlaying the background rectangle. Regardless, the background rectangle as well as the other components may be referred considered "GUI components" in accordance with the described techniques.

As used herein, the term "snapping template" refers to a modifiable template that is presented for display in a workspace and that allows users to create new GUI components (e.g., different shapes, text boxes, lines, and so forth), move the new components around in the workspace, and snap the new components to different alignment markers of the snapping template. The snapping template may present the screenshot from which the snapping template was generated, in one or more implementations. However, the presented screenshot may serve merely as a reference to which new GUI components can be snapped—the screenshot is not configured to be part of a new user interface design generated from the snapping template. In other words, components of the new user interface design may be introduced to overlay the presented screenshot.

As used herein, "alignment markers" refer to geometric landmarks that correspond to GUI components detected in a screenshot of an existing GUI. Consider an example in which the existing GUI has a square-shaped component. In this example, alignment markers may be determined for the corners of the square, a center of the square, halfway points along the edges of the square, and so forth. In addition to the alignment markers themselves, axes that extend along or through the alignment markers may be used for snapping GUI components in a template. In this way, a new GUI component can be aligned in one example to a vertical middle of a captured GUI's components.

As used herein, the term "wireframe template" refers to a modifiable template that is presented for display in a workspace and is generated from a screenshot of an existing GUI to automatically include new GUI components that generally approximate the components of the existing GUI. Additionally, these components are configured to have a same size and be positioned in a same location as corresponding components in the existing GUI. In the wireframe template, however, the new GUI components are unstylized.

As used herein, the term "stylized template" refers to a modifiable template that is presented for display in a workspace and is generated from a screenshot of an existing GUI to automatically include new GUI components to match the components of the existing GUI. These components are not only configured to have a same size and position as corresponding components of the existing GUI, but also to have at least some of the styling of the corresponding components. Consider again the example in which an existing GUI captured in a screenshot has a component that is a solid-filled blue rectangle with rounded corners.

As used herein, the term "GUI development" refers to any of a variety of different actions in the lifecycle of GUI creation. GUI development may not only refer to selecting a portion of a display for capture of a screenshot, but may also refer to designing GUI components as well as developing code or otherwise implementing functionality of a designed GUI. Indeed, GUI development may refer to a variety of additional actions without departing from the spirit or scope of the techniques described herein.

Given this, a "GUI developer" or simply "developer" refers to a user that performs one or more actions associated with GUI development. By way of example, a user that solely designs GUI components for a GUI may be referred to as a GUI developer. A user that solely develops code to implement functionality of a GUI may also be referred to herein as a GUI developer. Accordingly, users involved in aspects of both GUI design and functionality development may be referred to as GUI developers.

Similarly, "GUI-development tools" refers to applications or functionality that enable users to perform one or more GUI development actions. By way of example, an application that solely enables design of GUI components for a GUI may be referred to as a GUI-development tool. An application that merely enables code development to implement functionality of a GUI may also be referred to herein as a GUI-development tool. Applications that enable aspects of both GUI design and functionality development may be referred to as GUI-development tools as well.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 9.

The computing device 102 is illustrated as including a screenshot capturing module 104. The screenshot capturing module 104 represents functionality of the computing device to capture a screenshot of a graphical user interface (GUI) or a portion of a GUI displayed via a display of the computing device 102. By way of example, the screenshot capturing module 104 may allow a user to capture a screenshot of a GUI with a keyboard shortcut, by initiating some tool that allows the user to draw a capture-window around the GUI or desired portion, and so forth. The screenshot capturing module 104 may allow a user to capture a screenshot of a GUI or a portion thereof in a variety of different ways without departing from the spirit or scope of the technique described herein. Additionally, the screenshot capturing module 104 represents functionality to generate digital content, such as an image, for the screenshot. Such digital content can be pasted or otherwise imported into a GUI development application (not shown) accessible to a user of the computing device 102.

The computing device 102 also includes user interface development content 106 (UI development content 106), which is illustrated as maintained in storage 108 of the computing device 102. The UI development content 106 can include screenshots of GUIs, which are represented by user interface screenshot content 110 (UI screenshot content 110). The UI development content 106 can also include created user interface content 112 (created UI content 112), which represents GUI templates that are generated and capable of being modified by developers to generate new GUIs according to the described techniques. The UI development content 106 can also include digital content, such as images, indicative of user interface designs. The created UI content 112 may also represent actual GUIs that can be generated after a developer modifies such templates. The actual GUIs may be capable of being deployed for use, such as for use in an application, web page, and so on. The UI development content 106 may include a variety of other data, such as metadata or code produced in connection with generating the created UI content 112 from the UI screenshot content 110 without departing from the sprit or scope of the techniques described herein.

The computing device 102 is also illustrated including screenshot processing system 114. The illustrated screenshot processing system 114 is implemented at least partially in hardware of the computing device 102 to process the UI screenshot content 110 to generate at least some of the created UI content 112 according to the described techniques. This can include obtaining the UI screenshot content 110, e.g., from the screenshot capturing module 104, from user input to drag or drop an image file comprising a screenshot into a GUI development application, based on a selection of the screenshot (e.g., through a file-opening dialog box), and so on. Processing the UI screenshot content 110 can also involve detecting GUI components from a screenshot as described in more detail below. Although illustrated as implemented locally at the computing device 102, functionality of the illustrated screenshot processing system 114 may also be implemented in whole or part via functionality available via network 116, such as part of a web service or "in the cloud."

Examples of functionality incorporated by the illustrated screenshot processing system 114 are illustrated as component detection module 118 and user interface construction module 120 (UI construction module 120). The component detection module 118 and UI construction module 120 are implemented at least partially in hardware of the computing device 102 (e.g., through use of a processing system and computer-readable storage media) to ascertain GUI components from screenshots represented by the UI screenshot content 110, generate different templates in which aspects of captured user interfaces are created based on the ascertained GUI components, and enable user manipulation of the templates to produce new GUIs or portions of GUIs.

To ascertain user interface components from a screenshot, the component detection module 118 may process the screenshot according to a variety of techniques. By way of example, the component detection module 118 may initially convert a screenshot of a user interface to grayscale, run an edge detector on the converted grayscale image to detect edges of GUI components, group connected pixels into contiguous groups, associate screen locations with the contiguous groups, compare the contiguous groups and associated locations to known user interface components, and identify at least a type of known user interface component for each contiguous group based on the comparing. The UI construction module 120 may then generate a variety of different types of templates for developing new user interfaces based on the types of user interface components identified and associated locations determined. Operation of the component detection module 118 and the UI construction module 120 is described in greater detail in relation to FIG. 3 in the following description and as shown in the user interface templates of FIGS. 4-6.

User Interface Creation from Screenshots

Figure 2:
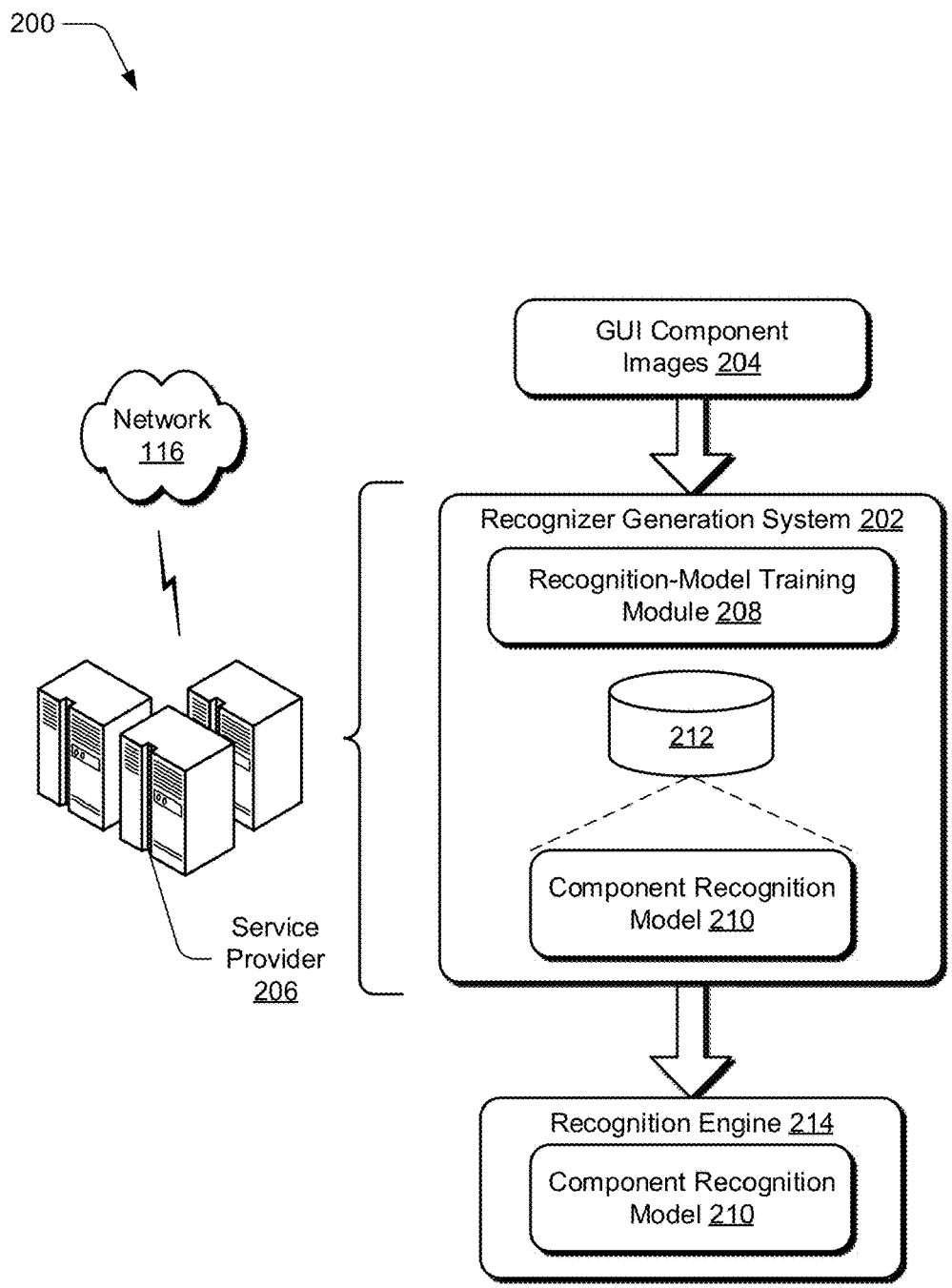
FIG. 2 depicts an example implementation in which a component recognizer generation system trains a model to recognize GUI components from screenshots.
Figure 3:
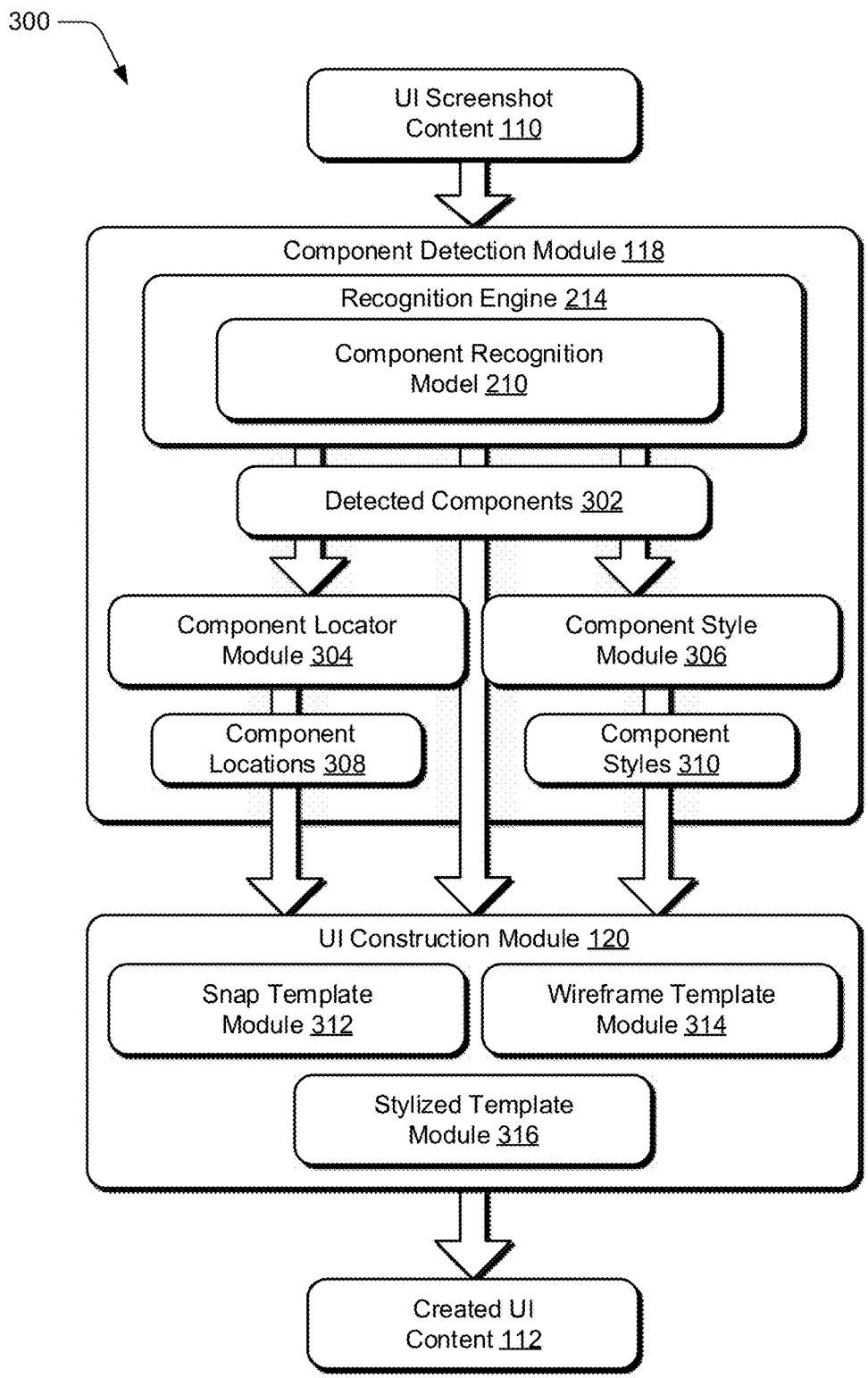
FIG. 3 depicts an example implementation in which a screenshot processing system of FIG. 1 generates a GUI template for creating a new user interface from a captured screenshot of an existing GUI.
Figure 4:
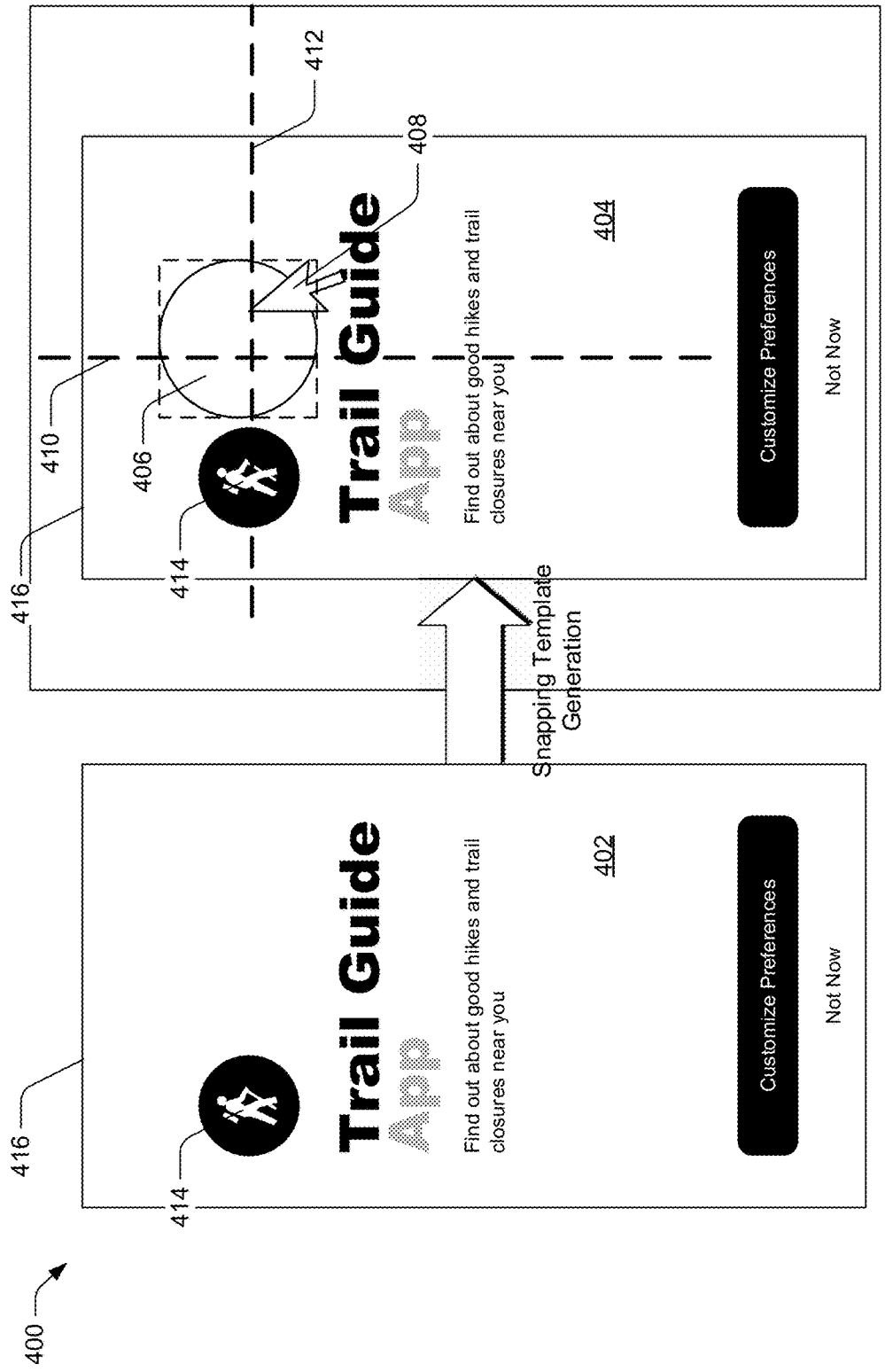
FIG. 4 depicts an example snapping user interface template that allows a developer to snap new GUI components to the template based on recognized GUI components of a screenshot.
Figure 5:
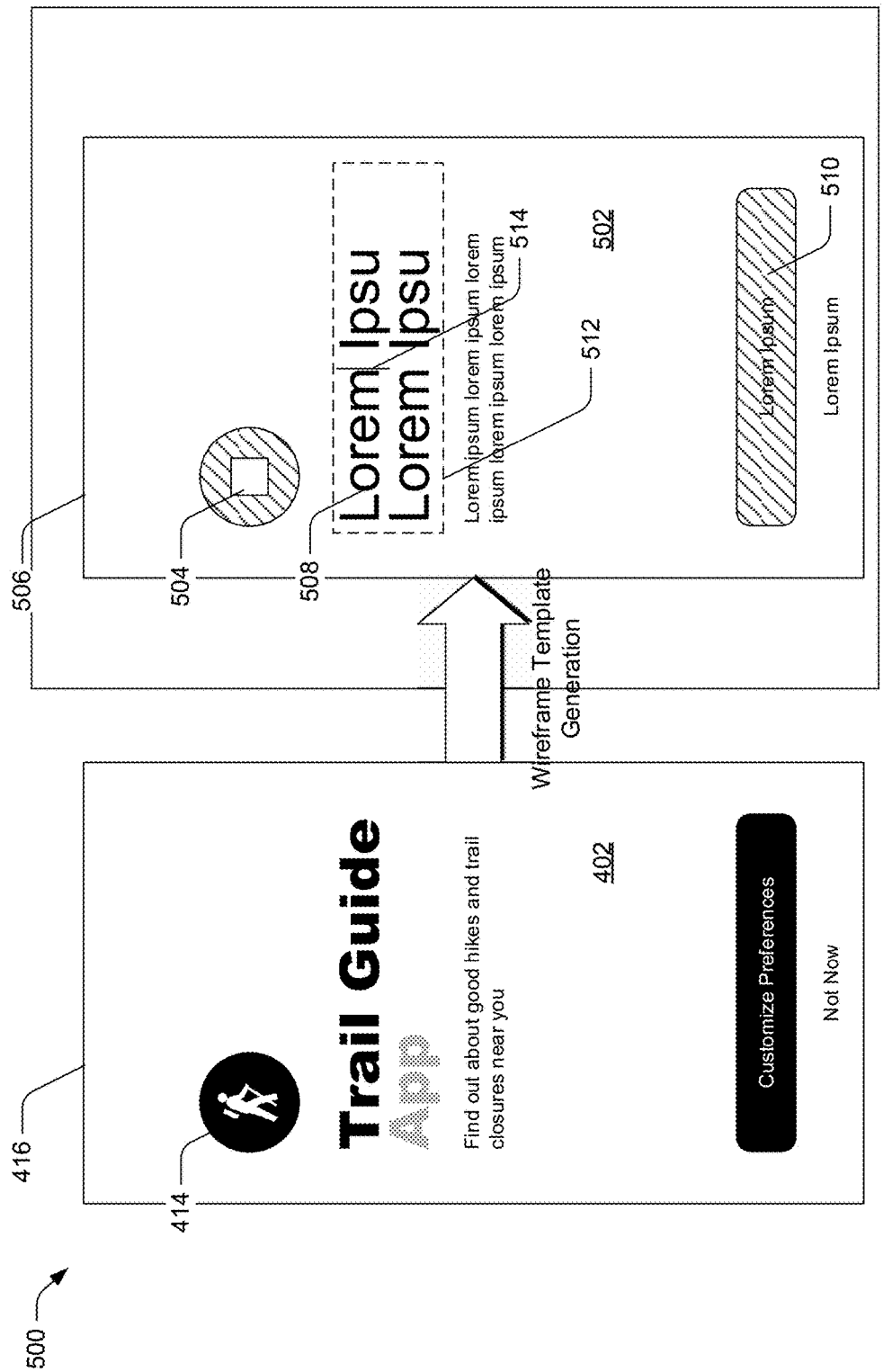
FIG. 5 depicts an example wireframe user interface template that includes unstylized GUI components that are based on recognized GUI components of a screenshot.
Figure 6:
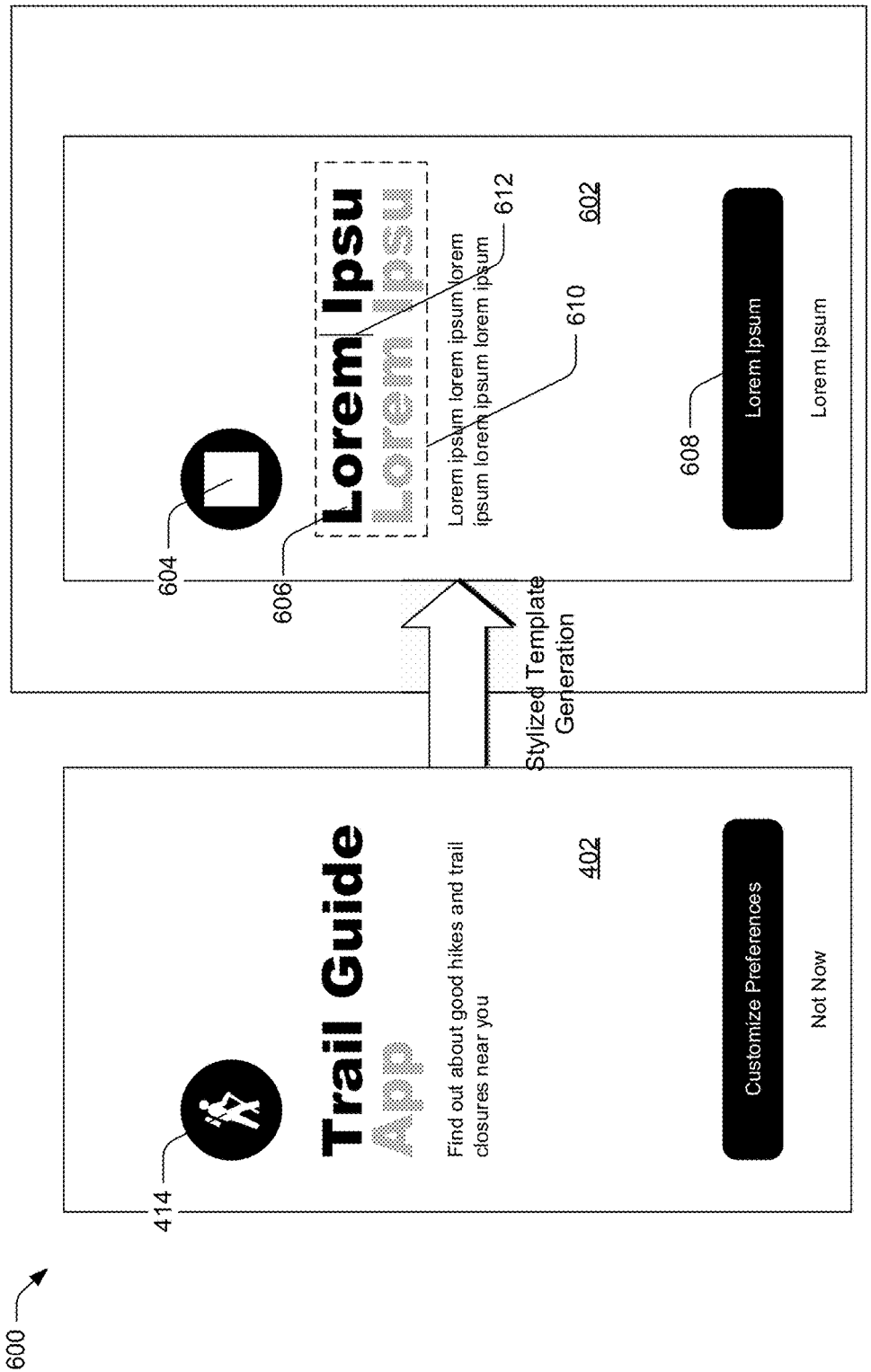
FIG. 6 depicts an example user interface template that includes stylized GUI components that are based on recognized GUI components of a screenshot.

FIG. 2 depicts a system 200 in an example implementation in which a generator of component recognizers uses images of graphical user interface (GUI) components to generate a model to recognize GUI components from screenshots. FIG. 3 depicts an example implementation in which the screenshot processing system 114 of FIG. 1 generates a GUI template for creating a new user interface from a captured screenshot of an existing GUI. FIGS. 4-6 depict different example user interface templates that enable users to create the new user interfaces.

The illustrated system 200 includes recognizer generation system 202, which is depicted obtaining GUI component images 204. The recognizer generation system 202 is illustrated as being implemented as a service provider 206 that is representative of functionality to provide services accessible via the network 116 to make products or services available to other devices connected to the network 116, such as the computing device 102. For instance, the service provider 206 may make available to the computing device 102: GUI development applications for download, updates to GUI development applications, modules to provide supplementary functionality for GUI development applications, updates to such modules, GUI templates that are modifiable by developers, and so on. Although functionality of the recognizer generation system 202 is illustrated as being incorporated as part of the service provider 206, this functionality may also be separate from the service provider 206, further divided among other entities, and so forth.

In general, the recognizer generation system 202 represents functionality to use machine learning to learn characteristics indicative of GUI components from the GUI component images 204. The recognizer generation system 202 also represents functionality to build models that are capable of recognizing the GUI components later in screenshots captured by GUI developers in accordance with the learning. By way of example and not limitation, GUI components may comprise a variety of different objects, such as shapes that are selectable to provide input to a computing device (e.g., buttons), objects for presenting information to the users (e.g., text, images, graphics, etc.), shapes for organizing selectable shapes and presented information (e.g., bounding boxes, horizontal/vertical lines, etc.), and so forth. GUI components may also comprise a variety of different objects without departing from the spirit or scope of the techniques described herein.

The recognizer generation system 202 is illustrated with recognition-model training module 208. The recognition-model training module 208 represents functionality of the recognizer generation system 202 to apply one or more machine learning techniques to the GUI component images 204 to generate component recognition model 210, which is illustrated in storage 212 of the recognizer generation system 202. In order to recognize the wide variety of GUI components that developers may desire to use when developing new user interfaces, the recognition-model training module 208 learns characteristics from a large set of the GUI component images 204. Accordingly, the GUI component images 204 may include images that have been selected because they capture distinct user interfaces and/or user interfaces having distinct aspects.

By way of example, images in the set of the GUI component images 204 may be selected as being distinct insofar as the images capture unique layouts of user interfaces, unique shapes (e.g., one image may capture a component shaped as a rectangle while another image captures a component shaped as a rectangle with rounded corners), unique patterns that are repeated throughout a user interface, unique styles (e.g., colors, text styles, text sizes), and so forth. In one or more implementations, the GUI component images 204 may be selected by one or more persons as being distinct, and provided to the recognizer generation system 202. Alternately or in addition, a web crawler may be configured to crawl the web and/or other sources of information to identify distinct user interfaces, and provide the GUI component images 204 having the identified interfaces to the recognizer generation system 202.

Regardless of how the GUI component images 204 are obtained, the recognition-model training module 208 learns the characteristics of GUI components from the GUI component images 204. To learn these characteristics, the recognition-model training module 208 may leverage one or more machine learning techniques in connection with the GUI component images 204. By way of example, the recognition-model training module 208 may train multiple supervised classifiers so that each is configured to recognize a different type of GUI component. In this way, the component recognition model 210 may be implemented as multiple classifiers. The recognition-model training module 208 may, for instance, train a first classifier to recognize rectangles, a second classifier to recognize circles, a third classifier to recognize natural images, a fourth classifier to recognize text, and so on. To train a classifier to recognize a particular GUI component, the recognition-model training module 208 may obtain several example images of the particular component, e.g., for a rectangle-recognizing classifier a group of the GUI component images 204 depicting a variety of different rectangles is obtained. From such a group of images, the recognition-model training module 208 learns visual characteristics that are indicative of the respective component. The recognition-model training module 208 trains a corresponding classifier to recognize these learned visual characteristics. In this context, the recognition-model training module 208 may obtain a group of images depicting a variety of text. From those images, the recognition-model training module 208 is configured to learn visual characteristics indicative of text. Based on the learned visual characteristics indicative of the text, the recognition-model training module 208 trains a classifier to recognize the visual characteristics of text in screenshots, e.g., to recognize whether a group of pixels corresponds to text or is not text.

In implementations where the component recognition model 210 is implemented using classifiers, the recognition-model training module 208 may produce boosted tree classifiers, neural network classifiers, and so forth. In addition or alternately, the recognition-model training module 208 may leverage other machine learning techniques to learn GUI component characteristics and generate a model for recognizing GUI components from screenshots without departing from the spirit or scope of the techniques described herein. By way of example, the recognition-model training module 208 may leverage regression analysis, support vector machines, and so forth.

Once trained, the component recognition model 210 is configured to recognize GUI components from images of user interfaces, e.g., screenshots. Consider an example in which a screenshot captures a button configured as a rounded rectangle with text. From this screenshot, the component recognition model 210 can recognize the rounded rectangular shape of the button (as well as dimensions, styles, and so forth) and characteristics of text on the button. The component recognition model 210 is also used to provide information indicative of this recognition, e.g., one or more labels. In accordance with one or more implementations, the component recognition model 210 is packaged in recognition engine 214 for integration with a GUI development platform, such as a GUI development application. The recognition engine 214 may be part of a plug-in or library, for example, that can be integrated with a GUI development application to supply the functionality described herein. As discussed in relation to FIG. 3, the recognition engine 214 can be leveraged by the component detection module 118 to recognize GUI components from the UI screenshot content 110.

FIG. 3 depicts a system 300 in an example implementation capable of generating GUI templates for creating new user interfaces from captured screenshots of existing GUIs.

The illustrated system 300 is depicted with the component detection module 118 and the UI construction module 120 of FIG. 1. In this example, the component detection module 118 obtains the UI screenshot content 110, which, as noted above, may correspond to a screenshot captured by a user using functionality of the screenshot capturing module 104. The component detection module 118 may obtain the UI screenshot content 110 responsive to the user selecting to initiate UI creation in relation to a screenshot, e.g., dropping a screenshot of a user interface into a GUI development application and selecting an option to create a template of the captured user interface.

The component detection module 118 is depicted having the recognition engine 214 of FIG. 2. The component detection module 118 is configured to leverage the recognition engine 214's component recognition model 210 to recognize GUI components from the UI screenshot content 110. In association with the recognition, the recognition engine may produce detected components 302, which represent data indicative of the GUI components detected from the UI screenshot content 110. By way of example, the data may indicate a type of GUI components (e.g., text, shape, image, line, etc.). In one or more implementations, the detected components 302 may be indicated by labels corresponding to the type of GUI component determined using the component recognition model 210. Other information may also be determined for the GUI components and associated with type labels, some of which is discussed in more detail below. This information may describe a location of the components, specific attributes of the components (e.g., dimensions, size, styling, etc.), and so forth.

The component detection module 118 also represents functionality to process the UI screenshot content 110 so that the functionality of the recognition engine 214 can be leveraged. In general, the component detection module 118 represents functionality to segment the UI screenshot content 110 into groups of pixels, from which GUI components are ascertained. To segment the UI screenshot content 110, the component detection module 118 can convert the UI screenshot content 110 to a grayscale image. The component detection module 118 is also configured to detect edges found in the UI screenshot content 110 using one or more edge detection techniques. By way of example, the component detection module 118 may detect edges from the grayscale image. The component detection module 118 is capable of analyzing the detected edges and other characteristics of the grayscale image to group pixels of the UI screenshot content 110 into contiguous groups of pixels—each contiguous group corresponding to one user interface component and having a bounding rectangle. These groups of pixels may serve as the basis for leveraging the component recognition model 210, such that the component recognition model 210 is used to assign a component label to a group of the pixels that are within a bounding rectangle. In one or more implementations, the component detection module 118 leverages an edge detector to detect prominent edges in a screenshot and dilates the edges. The component detection module 118 may then leverage a connected components algorithm to determine groups of the pixels that correspond to a single component based, at least in part, on the dilated edges.

Consider the example in which the component recognition model 210 is implemented as a plurality of classifiers such that each classifier is configured to recognize a respective GUI component, e.g., a first classifier is configured to recognize rectangles, a second is configured to recognize circles, a third is configured to recognize text, a fourth is configured to recognize natural images, a fifth is configured to recognize noise, and so forth. In such implementations, each of the classifiers may be leveraged in relation to a group of pixels. A classifier that positively identifies the group of pixels as corresponding to a respective GUI component provides the component label for the group of pixels—the component label being indicative of the type of component. For instance, if the third classifier recognizes the group of pixels as text, then a label indicating the 'text' component type is assigned to the group of pixels. The component detection module 118 may process the UI screenshot content 110 in a variety of different ways to enable determination of the detected components 302 with the component recognition model 210 without departing from the spirit or scope of the techniques described herein.

As mentioned above, information in addition to component type may be determined about the detected components 302 and associated therewith. The component detection module 118 is depicted having component locator module 304 and component style module 306 which represent functionality to determine additional information about the detected components 302. At least some of this additional information may be determined based on a parametric model defined for each of the different detectable GUI components, e.g., each component label is associated with a respective parametric model for the component type. The parametric model for a given GUI component type may include parameters for describing an instance of the component. Through an analysis of the pixels that correspond to the instance of the GUI component, the additional information can be determined and parameterized. Consider an example in which a group of pixels is associated with a 'circle' label, e.g., based on a positive identification by a circle-component classifier. This group of pixels can also be associated with a circle parametric model. The circle parametric model can include parameters to which values can be ascribed to describe the particular instance. The parameters can be set to include values that describe center coordinates, radius, fill color, line color, line thickness, shadow, opacity, and so on. Each of these parameters may be assigned values by analyzing the pixels of the respective group. Parametric models may include a variety of different parameters for describing different aspects of GUI components without departing from the spirit or scope of the described techniques.

In this context, the component locator module 304 represents functionality to determine component locations of the detected components 302. In one or more implementations, coordinates can be assigned to each pixel of a screenshot, such that an upper left pixel of a screenshot has coordinates of (0, 0) and an adjacent pixel to the right of the upper left pixel has coordinates of (1, 0). Consequently, each pixel of a determined group of pixels may also be associated with coordinate values. The component locator module 304 can determine a location of each of the detected components 302 based on the coordinates of the respective pixels. With respect to the above-described parametric models, each of these models may have parameters that can be set to describe location-based features of the detected components 302, such as bounding box coordinates (e.g., lower left corner, lower right corner, upper left corner, and upper right corner). Broadly speaking, the component locations 308 describe positions of each of the detected components 302. Further, the component locations 308 enable a user interface template to be generated in which the detected components 302 are created and positioned in the template as corresponding components are positioned in the captured user interface.

As described above, the component locations 308 may describe the positions according to a coordinate system, such that a component location of the detected components 302 is described in terms of (x, y) coordinates. It should be appreciated, however, that other manners for describing the positions of the detected components 302 and other attributes may also be used. For example, the component locations 308 may simply be used to describe a center of a detected component. Depending on the respective parametric model, other information can be associated with the detected components 302 to enable them to be created in a similar position as in the screenshot. This other information may include scale, shift, rotation, and so forth. Alternately or in addition, the component locations 308 may be used to describe a variety of attributes of the detected components 302. In the context of a rectangular component, for instance, the component locations 308 may indicate coordinates for each of the rectangle's four corners—depending on the parameters of the respective parametric model. In other words, the component locations 308 may be configured in some implementations to describe a boundary of a detected component. The component locations 308 may also describe a depth of the detected components 302, e.g., using a z-order. The component locations 308 may describe a variety of different and/or additional location-based information of the detected components 302 without departing from the spirit or scope of the techniques describe herein.

The component style module 306 represents functionality to determine style information of the detected components 302. Consider, for instance, that one or more of the detected components 302 is determined to be a 'text' component. The component style module 306 is configured to determine one or more style attributes associated with the 'text' component, such as a font family, a particular font (or similar font, e.g., when the font used in a captured user interface is proprietary), a font size, a weight of the font (e.g., bold, narrow, etc.), font color, spacing attributes (e.g., character spacing, word spacing, etc.), capitalization characteristics (e.g., all caps, small caps, all lower case, and so on), effects applied to the font (e.g., strikethrough, underline, italic, shadowed, etc.), and so forth.

Like the location information, text style information may be determined based on an analysis of the group of pixels that correspond to a detected component, and depending on a respective parametric model. By way of example, this information may be determined through an analysis of pixels, such as by counting pixels between lines of text, between characters, applying optical character recognition (OCR) to the text, and so forth. When a text parametric model includes a parameter for describing text shadowing, for instance, the pixels adjacent to a text character can be tested to determine whether those pixels have a color value that corresponds to a determined background color or a color value indicative of a text shadow on the background. The component style module 306 may also be configured to determine paragraph attributes of the text, such as spacing between lines of a single paragraph, spacing between different paragraphs, alignment of paragraphs (e.g., center aligned, left aligned, right aligned, justified, etc.). This information may also be determined through an analysis of pixels, such as by determining x-coordinate values of left- and right-most pixels of lines of determined text. The component style module 306 may be configured to determine a variety of other text-styling attributes to describe text components without departing from the spirit or scope of the techniques described herein.

In addition to text-styling attributes, the component style module 306 is also configured to determine style attributes associated with other components. For example, the component style module 306 determines style attributes associated with the detected components 302 that are configured as shapes, such as 'rectangle' components, 'circle' components, 'triangle' components, and so on. By way of example, the component style module 306 may be configured to determine attributes such as a type of fill (e.g., no fill, solid color fill, gradient fill, pattern fill, etc.), one or more fill colors, characteristics of a line that bounds the shape if any (e.g., color, weight, etc.), characteristics of shape corners (e.g., rounded, beveled, mitered, etc.), rotation, transparency, scale, effects applied to the shape (e.g., shadowed, embossed, engraved, etc.).

This information may also be determined through an analysis of a respective group of pixels and depending on an associated parametric model. When a parametric model includes a parameter for describing a line thickness of a shape, the pixels of the respective group can be analyzed to determine a thickness of the shape's line, e.g., by counting pixels in a perpendicular direction from a detected edge. Similarly, the component style module 306 may be configured to test pixels to obtain other values, such as color values indicative of a shape fill color, a bounding line color, and so forth. The component style module 306 may be configured to determine a variety of other shape-styling attributes without departing from the spirit or scope of the techniques described herein. Further, although text and shape styling is described herein, the component style module 306 may be configured to determine a variety of other style information for, and associate the determined information with, the detected components 302 in accordance with one or more implementations.

Regardless of the particular style-related attributes determined, the component style module 306 may generate component styles 310 to describe the styles determined for the detected components 302. In one or more implementations, the component styles 310 comprise data that can be associated with the detected components 302 and that can be extracted to enable the detected components 302 to be created with the determined styles. As described below, different amounts of the style information can be applied to the detected components depending on the type of modifiable template generated. In connection with some templates there may be no style information applied. In other templates, a limited amount of style information can be applied, such as just a text size for a text component, while other style information of the components is assigned default values (e.g., each of the shapes may be configured with a boundary line having a same weight which may be modifiable and/or removable). The component styles 310 may also enable the detected components 302 to be created in a template with all the determined style information so that the detected components 302 have a same appearance as in the screenshot.

In the illustrated example, the UI construction module 120 is depicted obtaining the detected components 302, the component locations 308, and the component styles 310. From these, the UI construction module 120 can generate a variety of different templates that a user can leverage to create a new user interface. By way of example, the UI construction module 120 can use the detected components 302, the component locations 308, and the component styles 310 (or portions of these) to generate one or more of a snapping user interface template, a wireframe user interface template, and a stylized user interface template. Accordingly, the UI construction module 120 is depicted having snap template module 312 which represents functionality to generate snapping user interface templates, wireframe template module 314 which represents functionality to generate wireframe user interface templates, and stylized template module 316 stylized user interface templates, as discussed in relation to FIGS. 4-6.

Although depicted with these different modules, the UI construction module 120 may not include separate modules to generate the described user interface templates. Instead, the UI construction module 120 may generate the described user interface templates. Moreover, the UI construction module 120 may be configured with more or different modules than depicted (or have integrated functionality) to generate a variety of different types of user interface templates including or in addition to the templates described herein without departing from the spirit or scope of the techniques described herein.

The UI construction module 120 is depicted outputting the created UI content 112. In general, this represents that the UI construction module 120 generates templates that are modifiable by a user (e.g., via a GUI development application) to generate a new user interface. By way of example, output of the created UI content 112 may comprise the UI construction module 120 generating one or more of a snapping user interface template, a wireframe user interface template, or a stylized user interface template, and then providing the generated template(s) for modification by a user.

FIG. 4 illustrates an example 400 of a snapping user interface template that allows a developer to snap new GUI components to the template based on recognized GUI components of a screenshot. In particular, the illustrated example includes screenshot 402 and snapping template 404. In accordance with the described techniques, the screenshot 402 corresponds to the UI screenshot content 110 and may thus serve as input to the component detection module 118. To this extent, the component detection module 118 is capable of computing the detected components 302, the component locations 308, and the component styles 310 for the user interface captured in the screenshot 402. The snap template module 312 can then generate the snapping template 404 using at least a portion of this information, e.g., the detected components 302 and the component locations 308. In this context, snapping template 404 thus corresponds to the created UI content 112.

In one or more implementations, the snapping template 404 presents the screenshot 402. However, the screenshot may serve merely as a reference to which new GUI components can be snapped—the screenshot is not configured to be part of a new user interface design created from the snapping template 404. In other words, components of a new user interface may be introduced to overlay the presented screenshot. The illustrated example 400 depicts a scenario in which a user is adding circle 406 to the snapping template 404. By way of example, a user may have selected an option to add a new GUI component configured as a circle to the new user interface being created using the snapping template 404. Responsive to this selection, the circle 406 may have been generated in a working area of a GUI development application that includes the snapping template 404, such that the circle 406 can be dragged around the working area and to different parts of the snapping template 404 using cursor 408.

As the user drags the circle 406 around the snapping template 404, reference lines may be displayed, such as reference lines 410, 412. In general, reference lines may be presented when a GUI component for the new interface being created is moved near a location of, or near an axis that extends along or through, an alignment marker associated with the detected components 302. In general, alignment markers are associated with landmarks of the detected components 302. By way of example, an alignment marker may mark landmarks such as a leftmost point of a detected component, a topmost point of a detected component, a rightmost point of a detected component, a bottommost point of a detected component, a horizontal center of a detected component, a vertical middle of a detected component, shape corners, and so on. By "moved near" it is meant that the new GUI component is within some threshold distance of an alignment marker or an axis extending along or through the alignment marker.

In the context of the illustrated example 400, the reference lines 410, 412 may be displayed responsive to the user moving the circle 406 near alignment markers or associated axes of circle icon 414 and background box 416. In particular, the reference line 410 may be displayed in response to the circle 406 (or a portion of the circle 406) being moved near an axis extending through the horizontal center of the background box 416. The reference line 412 may be displayed in response to the circle 406 (or a portion of the circle 406) being moved near an axis extending through the vertical middle of the circle icon 414.

In addition to being displayed, reference lines may allow new GUI components to be snapped to them. By way of example, the snapping template 404 may enable the circle 406 to be snapped to one or more of the reference lines 410, 412. In particular, the snapping template 404 may enable a center of the circle 406 to be snapped to any point along the reference line 410. In this way, the circle 406 may be aligned to the horizontal center of the background box 416. In a similar fashion, the snapping template 404 may enable the center of the circle 406 to be snapped to any point along the reference line 412, such that the circle is aligned to the vertical middle of the circle icon 414. Although snapping the center of the circle 406 to the reference lines 410, 412 is discussed, the snapping template 404 may enable other alignment markers of the circle 406 (e.g., its leftmost, topmost, rightmost, or topmost points) to be snapped to the reference lines 410, 412.

In addition to snapping to reference lines, the snapping template 404 represents functionality to allow snapping to a variety of alignment markers of the detected components 302. For instance, the snapping template 404 may be configured to enable a center point of the circle 406 to be snapped to a center point of the circle icon 414. Further, as new GUI components are introduced to the snapping template 404, it may also display reference lines and enable snapping to alignment markers and associated axes of the new components. In one or more implementations, reference lines may not be displayed. Nevertheless, the snapping template 404 is configured to allow new GUI components to be snapped to the snapping template 404 based on alignment markers corresponding to the shapes and locations of the detected components 302.

FIG. 5 illustrates an example 500 of a wireframe user interface template that includes unstylized GUI components that are based on recognized GUI components of a screenshot. Like the example depicted in FIG. 4, the illustrated example 500 depicts a template generated based on the screenshot 402.

In contrast to the snapping template 404, however, the example 500 depicts a scenario in which wireframe template 502 is generated based on the screenshot 402. Broadly speaking, the wireframe template module 314 generates wireframe templates to automatically include new GUI components that generally approximate the detected components 302 of the UI screenshot content 110. Accordingly, a user may be able to manipulate the new GUI components of a wireframe template without having to select to individually create each component and position the components in place. Nonetheless, a user may still be able to add new components to a wireframe template by selecting to create them and moving them around a working space in which the wireframe template is presented. A user may also be able to remove the automatically generated components from a wireframe template.

By "generally approximate the detected components," it is meant that the wireframe template module 314 generates the new GUI components of wireframe templates to have a similar shape (e.g., including size) as the detected components 302, positions the new components in corresponding locations, as indicated by the component locations 308. However, the new GUI components may not be styled in a same manner as a corresponding one of the detected components 302. Instead, the new GUI components may be "unstylized," which may correspond to configuring the new GUI component with default style information that is intended to be changed by a user. As one example, new GUI components configured as shapes may all be configured to have a same fill (e.g., type, color, transparency) in a wireframe template.

Consider the illustrated example 500 in accordance with one or more implementations. The wireframe template module 314 may generate the wireframe template 502 to include new GUI components that generally approximate the detected components 302 of the screenshot 402. However, the new GUI components included in the wireframe template 502 are not generated to have the styles of the detected components 302. In particular, the wireframe template module 314 may generate new circle icon 504 of the wireframe template 502 to approximate the circle icon 414, new interface background 506 of the wireframe template 502 to approximate the background box 416, new heading text 508 to approximate the "Trail Guide App" text of the screenshot 402, new button 510 to approximate the "Customize Preferences" button of the screenshot 402, and so forth.

In accordance with the described techniques, the new circle icon 504 may approximate the circle icon 414 insofar as it is circle-shaped, is located in a position on the new interface background 506 that corresponds to the position of the circle icon 414 on the background box 416, and has a same size. In accordance also with the described techniques, the new circle icon 504 is depicted being unstylized—like the new button 510 the new circle icon 504 may simply have default styling. This unstylized configuration of the new circle icon 504 is depicted through differences with the circle icon 414, e.g., whereas the circle icon 414 includes a depiction of a hiker and is solid black the new circle icon 504 is depicted being hashed and having a simple square depiction in the middle.

The new button 510 is also depicted approximating the customize preferences button of the screenshot 402 but being unstylized. The new button 510 is depicted approximating the customize preferences button insofar as the new button 510 is located in a position on the new interface background 506 that corresponds to the customize preferences button's position on the background box 416 and is a same shape (e.g., a rounded rectangle of the same size). The unstylized configuration of the new button 510 is depicted through differences with the customize preferences button of the screenshot 402, e.g., whereas the customize preferences button of the screenshot includes the text "Customize Preferences" and is solid black the new button 510 is depicted being hashed and having default text "Lorem Ipsum."

The new heading text 508 is depicted approximating the "Trail Guide App" text of the screenshot 402 insofar as the new heading text 508 is located in a same location and has a same size font. The new heading text 508 is unstylized though insofar as it is a different font (e.g., a default font), is not weighted where the "Trail Guide App" is thick, is a single color, and so forth. In addition, the new heading text 508 is instantiated with default text "Lorem Ipsum." Although "Lorem Ipsum" is used in the illustrated example, text components may be filled using other default text without departing from the spirit or scope of the techniques described herein.

The illustrated example 500 also includes text-edit box 512 with text-entry cursor 514. This represents that the wireframe template 502 allows a user to modify the default text included in the new heading text 508. The text of the new button 510 and other text included in the wireframe template 502 may be modifiable by a user in a similar manner. In general, each of the new GUI components of the wireframe template 502 are modifiable by a user. By way of example, a user may select that the new circle icon 504 have a solid fill and select a color of the fill. The wireframe template 502 also enables the user to change the depicted object in the new circle icon 504 to something other than the simple square depiction. In general, the wireframe template 502 allows a user to change a variety of different characteristics of the generated new GUI components without departing from the spirit or scope of the techniques described herein.

FIG. 6 illustrates an example 600 of a wireframe user interface template that includes stylized GUI components that are based on recognized GUI components of a screenshot. Like the example depicted in FIGS. 4 and 5, the illustrated example 600 depicts a template generated based on the screenshot 402.

In contrast to the other template examples though, the example 600 depicts a scenario in which stylized template 602 is generated based on the screenshot 402. Broadly speaking, the stylized template module 316 generates stylized templates not only to include new GUI components for each detected component 302 of the UI screenshot content 110, but also so that styling of the new GUI components substantially matches styling of the detected components 302. To do so, the stylized template module 316 is configured to use the component styles 310. In particular, the stylized template module 316 applies the component styles 310 to the detected components in connection with generating a stylized template. Stylized templates may thus be presented to a user with styling applied to the new GUI components so that the templates have the look and feel of the UI screenshot content 110.

Like the wireframe template, a user may be able to manipulate the new GUI components of a stylized template without having to select to individually create each component and position the components in place. Additionally, stylized templates style the new GUI components so that if the user chooses to keep the styles of the UI screenshot content 110, the user does not need to perform additional actions, e.g., provide input to select style information for the new GUI components. Despite creating each of the detected components 302 as new GUI components, the stylized template may nevertheless enable users to add further new GUI components to the stylized template, e.g., by selecting to create new GUI components and moving them around a working space in which the stylized template is presented. A user may also be able to remove the automatically generated components from the stylized template.

Consider the illustrated example 600 in accordance with one or more implementations. The stylized template module 316 may generate the stylized template 602 to include new GUI components for each of the detected components 302 of the screenshot 402. Additionally, the stylized template module 316 is configured to apply the component styles 310 so that styling of the new GUI components of the stylized template 602 matches styling of the detected components 302 of the screenshot 402.

In particular, the stylized template module 316 may generate stylized circle icon 604 to match the circle icon 414, stylized heading text 606 to match the "Trail Guide App" text of the screenshot 402, stylized button 608 to match the "Customize Preferences" button of the screenshot 402, and so forth. By "match", it is meant that the stylized template module 316 stylizes the stylized circle icon 604, the stylized heading text 606, and the stylized button 608, with the component styles 310 determined for the corresponding components of the screenshot 402. Unlike the new heading text 508 of the wireframe template 502, the stylized heading text 606 of the stylized template 602 has a same font as the "Trail Guide App" text of the screenshot 402, e.g., the font is weighted the same and has multiple different colors like the "Trail Guide App" text (black on a top line and gray on a bottom line).

The illustrated example 600 also includes text-edit box 610 with text-entry cursor 612. This represents that the stylized template 602 allows a user to modify the default text included in the stylized heading text 606, e.g., "Lorem Ipsum." The other new GUI components of the stylized template 602 may also be modified by a user in a variety of different ways. For example, a user may modify locations, sizes, styling, text, and a variety of other attributes of the new GUI components.

In one or more implementations, generation of the snapping template 404, the wireframe template 502, and the stylized template 602 involves normalizing the new GUI components of the template. In some instances, new GUI components positioned according to the component locations 308 may not initially be connected with other components detected using the component recognition model 210. By way of example, each word in a line of text or paragraph may be determined as separate components. In the original user interface (captured via a screenshot), however, the line or paragraph may be part of a single component, e.g., composed within a text box having defined boundaries. Accordingly, the UI construction module 120 may normalize a plurality of individual-word components by combining them into a single text-box component.

In addition to combining individual components, the UI construction module 120 may also normalize the components by making alignment adjustments. By way of example, a captured user interface may include a repeating pattern, such as a list of objects for sale. In this pattern, listings for the items may be arranged vertically (one on top of another), each listing may include words describing an object for sale on a left side and a square image associated with the object on a right side, and the squares may be a same size and arranged in a vertical column such that the left and right sides of the squares align. When the component locations 308 are detected for these squares, however, some of the component locations 308 may not be accurate, e.g., causing squares to be out of alignment by one or more pixels. Accordingly, the UI construction module 120 may normalize new GUI components by aligning them based on an analysis of the component locations 308. The UI construction module 120 may normalize new GUI components in a variety of other ways without departing from the spirit or scope of the techniques described herein.

Having discussed example details of the techniques for user interface creation from screenshots, consider now some example procedures to illustrate additional aspects of the techniques.

Example Procedures

This section describes example procedures for user interface creation from screenshots in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 that makes use of a component detection module 118 and UI construction module 120 or the example system 200 of FIG. 2, which also makes use of those modules. A suitable device for performing the procedures may also be the service provider 206 of FIG. 2 that makes use of the recognizer generation system 202 having a recognition-model training module 208.

Figure 7:
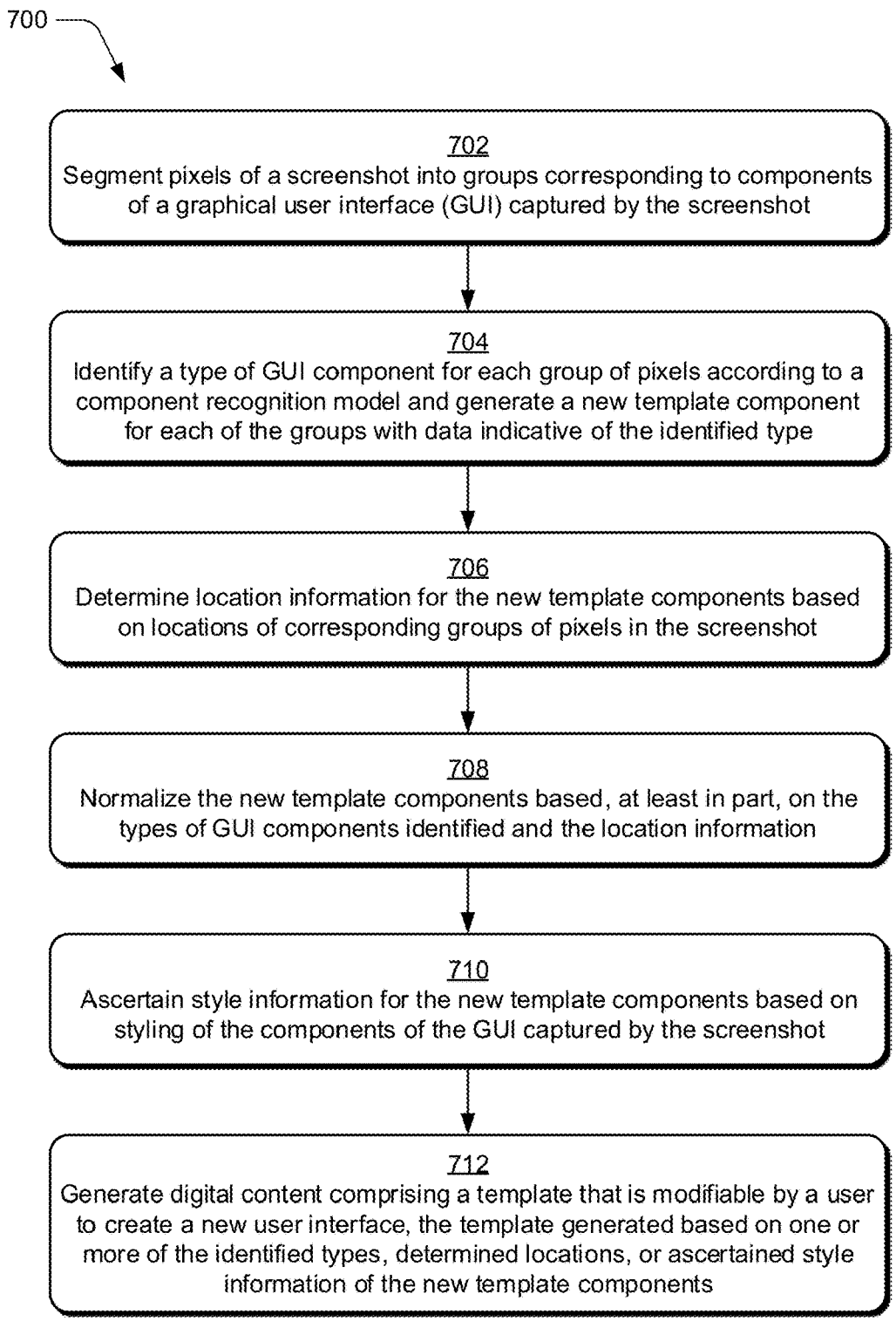
FIG. 7 depicts a procedure in an example implementation in which a template for creating a new user interface is generated from a screenshot of an existing user interface.

FIG. 7 depicts an example procedure 700 in which a template for creating a new user interface is generated from a screenshot capturing an existing user interface. As noted above, a screenshot that captures an existing graphical user interface (GUI) may be obtained in a variety of different ways. To generate a modifiable template from the screenshot, pixels of the screenshot are initially segmented into groups that correspond to components of the GUI captured in the screenshot (block 702). By way of example, the component detection module 118 segments pixels of the screenshot 402 into groups that correspond to components of the GUI captured in the screenshot 402, e.g., such as groups that correspond to the circle icon 414, the background box 416, and so on.

A type of GUI component is identified for each group of pixels according to a component recognition model (block 704). In accordance with the principles discussed herein, a new template component is generated for each of the groups with data indicative of the identified type of GUI component. By way of example, the recognition engine 214 uses the component recognition model 210 to identify types of GUI components for each group of pixels determined for the screenshot 402. The recognition engine 214 uses the component recognition model 210 to identify types of GUI components for the circle icon 414 and the background box 416, for instance. Further, the component detection module 118 generates new template components (e.g., detected components 302) to have data (e.g., a type label) indicative of the identified type of GUI component.

Location information is determined for the new template components based on locations of corresponding groups of pixels in the screenshot (block 706). By way of example, the component locator module 304 determines location information for the new circle icon 504, the new interface background 506, and the new heading text 508 based on locations of the circle icon 414, the background box 416, and the "Trail Guide App" text, respectively, of the screenshot 402.

The new template components are normalized based, at least in part, on the types of GUI components identified and the location information (block 708). By way of example, the UI construction module 120 normalizes the detected components 302 based, at least in part, on the types of GUI components identified in block 704 and the component locations 308. As noted above, the UI construction module 120 may normalize the detected components 302 by combining two or more of them into a single component, adjusting the location information of one or more detected components 302 based on the location information of at least one other detected component 302, and so forth.

Style information is ascertained for the new template components based on styling of the components of the GUI captured by the screenshot (block 710). By way of example, the component style module 306 ascertains style information for the new circle icon 504, the new interface background 506, and the new heading text 508 based on styling of the circle icon 414, the background box 416, and the "Trail Guide App" text, respectively, of the screenshot 402

Digital content is generated that comprises a template capable of being modified by a user to create a new user interface (block 712). In accordance with the principles discussed herein, the template is generated based on one or more of the identified types of GUI components, the determined locations, or the ascertained style information. By way of example, the UI construction module 120 leverages functionality of the snap template module 312 to generate the snapping template 404. Alternately or in addition, the UI construction module 120 leverages functionality of the wireframe template module 314 to generate the wireframe template 502. Alternately or in addition, the UI construction module 120 leverages the functionality of the stylized template module 316 to generate the stylized template 602. The snap template module 312, wireframe template module 314, and stylized template module 316, may generate these templates based on one or more of the types identified at block 704, the locations determined at block 706, or the style information ascertained at block 710.

Figure 8:
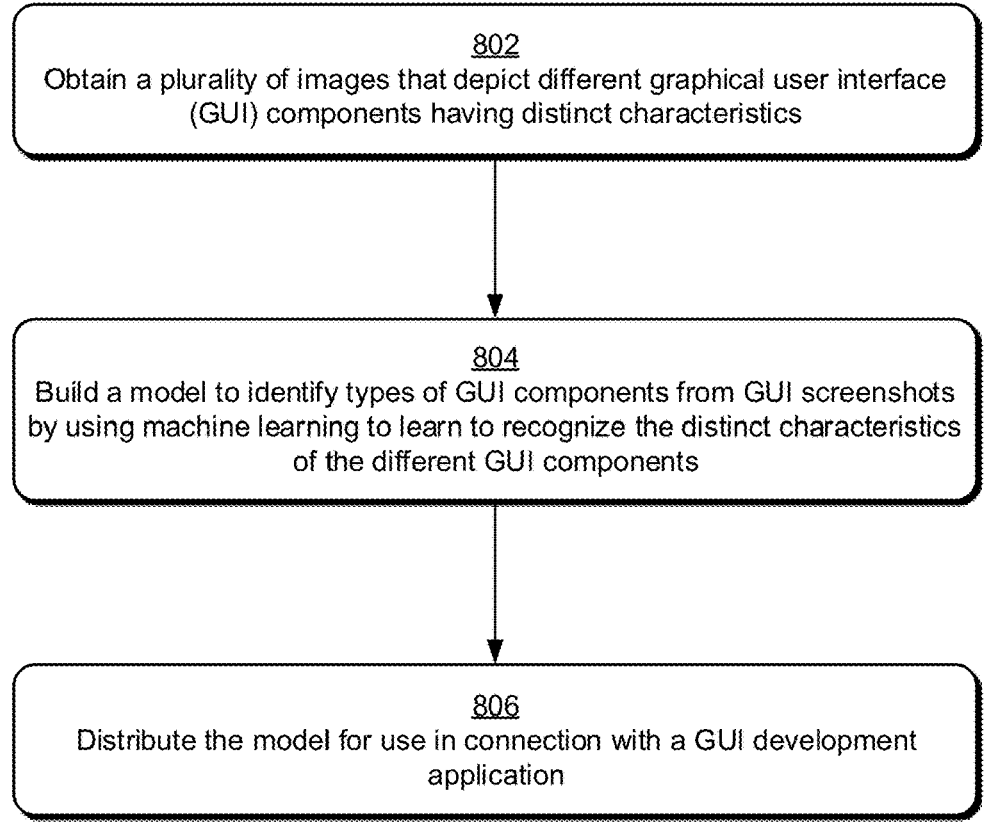
FIG. 8 depicts a procedure in an example implementation in which a model capable of identifying GUI components from screenshots is built.

FIG. 8 depicts an example procedure 800 in which a model capable of identifying GUI components from screenshots is built from a set of images depicting different GUI components having distinct characteristics.

A plurality of images that depict different GUI components having distinct characteristics is obtained (block 802). By way of example, the recognizer generation system 202 obtains the GUI component images 204. As mentioned above, the GUI component images 204 are selected for depicting different GUI components having distinct characteristics, such as unique layouts, unique shapes (e.g., one image may capture a component shaped as a rectangle while another image captures a component shaped as a rectangle with rounded corners), unique patterns repeated throughout a user interface, unique styles (e.g., colors, text styles, text sizes), and so forth.

A model is built to identify types of GUI components from GUI screenshots (block 804). In accordance with the principles discussed herein, the model is built using machine learning that learns to recognize the distinct characteristics of different types of the GUI components. By way of example, the recognition-model training module 208 builds the component recognition model 210 to identify types of GUI components from screenshots, e.g., the screenshot 402. The recognition-model training module 208 builds the component recognition model 210 using one or more machine learning techniques, such as classification, regression, or neural networks. Regardless of the particular type of machine learning used, it is capable of learning to recognize the distinct characteristics of different types of GUI components depicted in the GUI component images 204.

The model is distributed for use in connection with a GUI development application (block 806). By way of example, the recognizer generation system 202 packages the component recognition model 210 in a recognition engine 214, and communicates the recognition engine 214 across the network 116 to an application developer for incorporation into a GUI development application. Alternately or in addition, the recognizer generation system 202 communicates the recognition engine 214 across the network 116 to the computing device 102 for incorporation with the screenshot processing system 114, the functionality of which may be leveraged by a GUI development application that is accessible to the computing device 102.

Having described example procedures in accordance with one or more implementations, consider now an example system and device that can be utilized to implement the various techniques described herein.

Example System and Device

Figure 9:
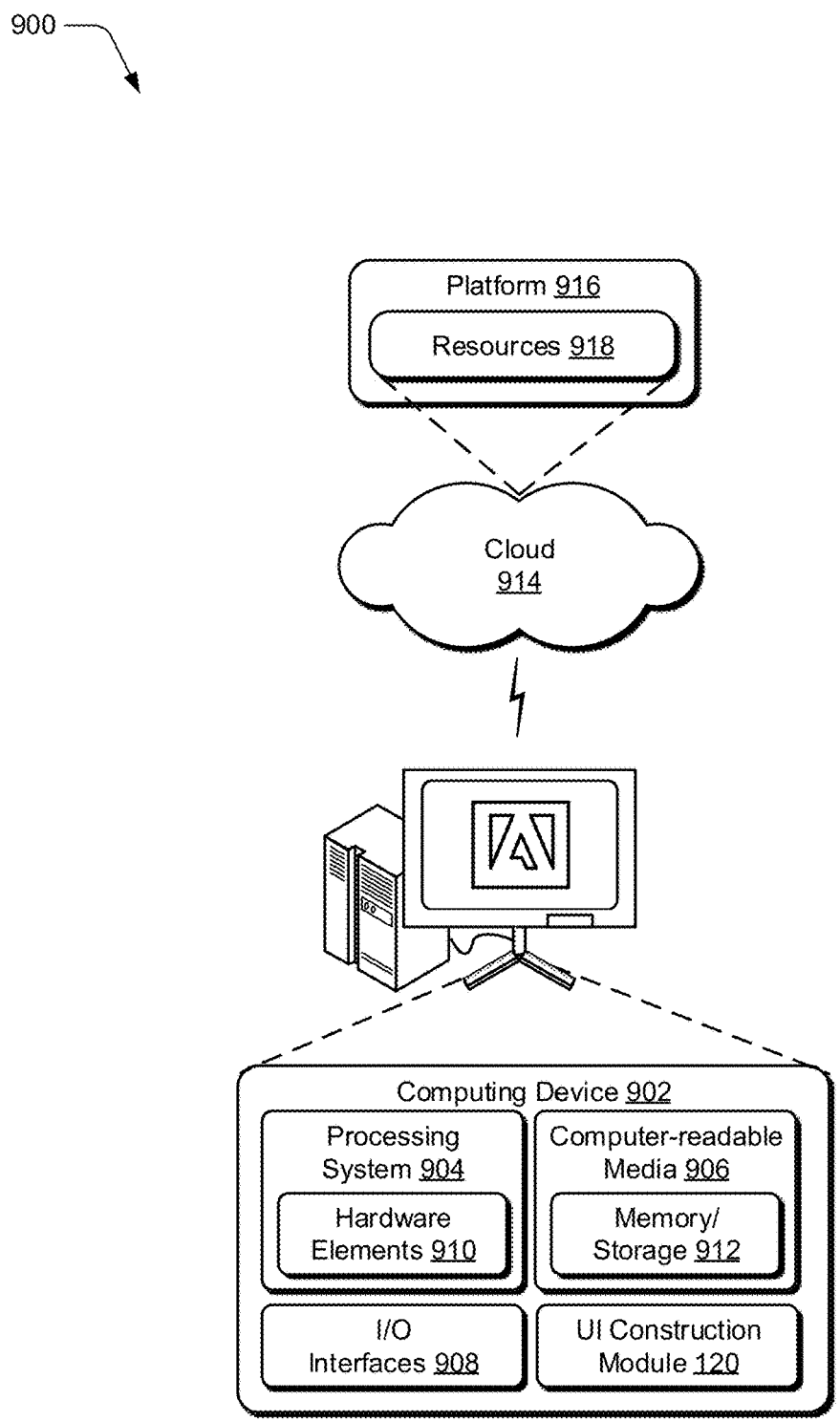
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the UI construction module 120. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to create a new graphical user interface (GUI) from a screenshot of an existing GUI, a method implemented by a computing device, the method comprising:
    obtaining, by the computing device, the screenshot of the existing GUI, the screenshot obtained, in part, based on user selection to capture the screenshot;
    segmenting, by the computing device, pixels of the screenshot into groups corresponding to components of the existing GUI;
    identifying, by the computing device, types of GUI components for the groups of pixels using a component recognition model that indicates for each group of pixels one of a plurality of different types of GUI components based on detecting characteristics associated with the one type of GUI component in the group of pixels;
    determining, by the computing device, locations of the groups of pixels in the screenshot; and generating, by the computing device, digital content comprising a template that is modifiable by a user to create the new GUI, the template being generated to include new GUI components configured according to identified types of GUI components and positioned in the template based on the locations.

2. A method as described in claim 1, wherein the template comprises a snapping template that enables the new GUI components to be snapped to at least one of:
    alignment markers of the snapping template that mark geometric landmarks of the identified types of GUI components; or
    axes of the snapping template that extend along or through the alignment markers.

3. A method as described in claim 2, further comprising receiving user selections to create the new GUI components.

4. A method as described in claim 2, wherein the new GUI components are snapped to the alignment markers or axes based on user input to position the new GUI components in the snapping template.

5. A method as described in claim 1, wherein the new GUI components of the template are styled with default styling rather than style information ascertained from the components of the existing GUI.

6. A method as described in claim 1, wherein the new GUI components are configured to have substantially a same size and shape as the components of the existing GUI.

7. A method as described in claim 1, wherein the new GUI components configured as text are configured to have a same font size as corresponding text components of the existing GUI.

8. A method as described in claim 7, wherein the new GUI components configured as the text are configured with a default font style rather than a font style ascertained from the corresponding text components of the existing GUI.

9. A method as described in claim 1, further comprising determining styling for the components of the existing GUI, the template being generated further based on the determined styling of the components of the existing GUI.

10. A method as described in claim 9, wherein the template comprises a stylized template that includes the new GUI components, the new GUI components being stylized according to the determined styling of the components of the existing GUI.

11. A method as described in claim 1, further comprising generating digital content indicative of the new GUI according to the template.

12. A method as described in claim 1, further comprising receiving user input to modify an attribute of a new GUI component of the template.

13. A method as described in claim 1, further comprising presenting the template for user modification via a GUI development application.

14. A system implemented in a digital medium environment to create a new graphical user interface (GUI) from a screenshot of an existing GUI, the system comprising:
    at least one processor; and
    memory having stored thereon computer-readable instructions that are executable by the at least one processor to perform operations comprising:
        obtaining the screenshot of the existing GUI, the screenshot obtained, in part, based on user selection to capture the screenshot;
        segmenting pixels of the screenshot into groups that correspond to components of the existing GUI by detecting edges of the components of the existing GUI in a grayscale image corresponding to the screenshot;

identifying the components of the existing GUI using a component recognition model that recognizes different types of GUI components by detecting characteristics indicative of the different types in the groups of pixels; and generating digital content comprising a template that is modifiable by a user to create the new GUI, the template being generated based on the identifying component.

15. A system as described in claim 14, wherein the operations further comprise converting the screenshot to the grayscale image of the existing GUI.

16. A system as described in claim 14, wherein the template comprises:

a snapping template;

a wireframe template; or a stylized template.

17. A system as described in claim 14, wherein the operations further comprise:

determining locations of the components of the existing GUI;

determining styles of the components of the existing GUI; and generating the template further based on at least one of the locations or styles.

18. In a digital medium environment to recognize graphical user interface (GUI) components from screenshots of existing GUIs, a method implemented by a computing device, the method comprising:

obtaining, by the computing device, a set of images depicting different GUI components;

determining, by the computing device, characteristics of the different GUI components by analyzing the images;

building, by the computing device, a component recognition model by learning the characteristics of the different GUI components using machine learning, the component recognition model indicating types of GUI components for different groups of pixels of a screenshot based on captured characteristics of the different groups of pixels; and generating, by the computing device, digital content comprising a recognition engine for use by a GUI development application, the generating including incorporating the component recognition model into the recognition engine, the recognition engine being usable to generate a new GUI from a screenshot of an existing GUI obtained based on user input to capture the screenshot.

19. A system as described in claim 14, wherein the operations further include presenting the new GUI for user modification via a GUI development application.

20. A system as described in claim 14, wherein the operations further include receiving user input to modify an attribute of a new GUI component of the template.

* * * * *

UNITED STATES PATENT AND TRADEMARK OFFICE
CERTIFICATE OF CORRECTION

PATENT NO. : 10,360,473 B2
APPLICATION NO. : 15/608641
DATED : July 23, 2019
INVENTOR(S) : Morgan Emory Dixon et al.

It is certified that error appears in the above-identified patent and that said Letters Patent is hereby corrected as shown below:

In the Claims

Column 25, Line 11, after "based on the", delete "identifying component", insert -- identifying --, therefor.

Signed and Sealed this
Twenty-second Day of October, 2019

Andrei Iancu
*Director of the United States Patent and Trademark Office*